United States Patent

[11] 3,619,340

| [72] | Inventor | Peter Jones<br>2211 Verde Oak Drive, Hollywood, Calif. 90028 |
|---|---|---|
| [21] | Appl. No. | 792,378 |
| [22] | Filed | Jan. 21, 1969 |
| [45] | Patented | Nov. 9, 1971 |

[54] MULTILAYERED THERMAL INSULATION MATERIAL
7 Claims, 5 Drawing Figs.

| [52] | U.S. Cl. | 161/127, 161/139 |
|---|---|---|
| [51] | Int. Cl. | B32b 3/00, B32b 3/10 |
| [50] | Field of Search | 161/127, 130, 132, 125, 139 |

[56] References Cited
UNITED STATES PATENTS

| 2,179,057 | 11/1939 | Schuetz | 161/130 |
| 2,609,956 | 9/1952 | Stevenson | 161/127 |
| 3,011,602 | 12/1961 | Ensrud et al. | 161/127 |
| 3,108,924 | 10/1963 | Adie | 161/127 |

*Primary Examiner*—Morris Sussman
*Attorney*—Nienow & Frater

ABSTRACT: This invention relates to improvements in multilayered thermal insulation employing heat reflectivity in multiple layers of flexible, embossed, reflective material or of reflectively coated materials which are themselves heat insulators. The several layers are arranged in series and are embossed to define spaced, substantially dead, air cells. The walls of successive layers of cells are offset one from the other whereby compressive strength of the structure is maintained while providing substantial flexibility.

PATENTED NOV 9 1971 3,619,340
FIG.1
FIG.2
FIG.3
FIG.4
FIG.5
INVENTOR.
PETER JONES
BY
Nienow & Frater
ATTORNEYS
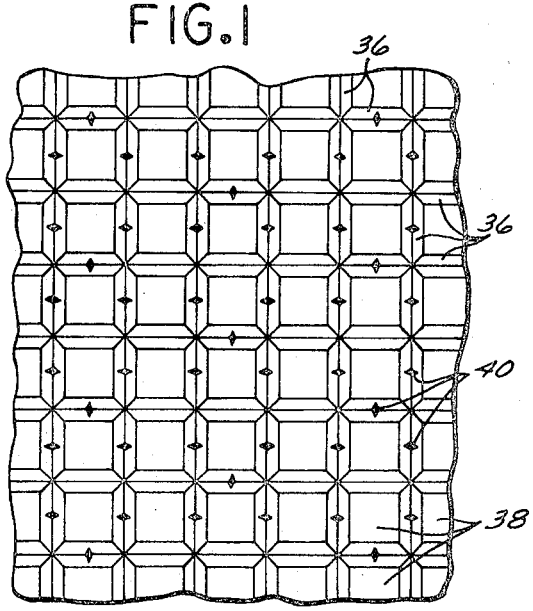
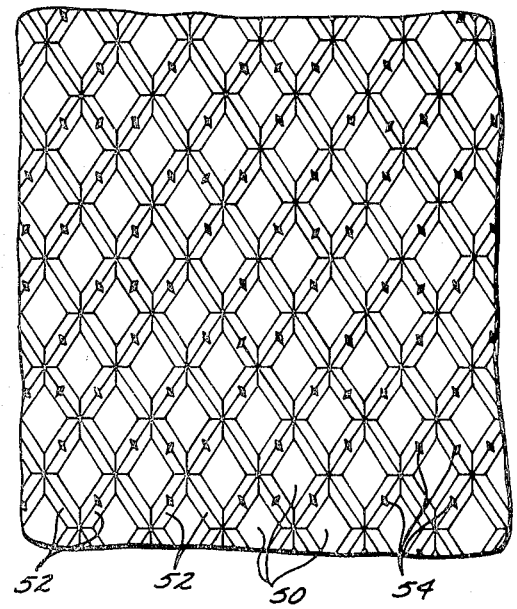
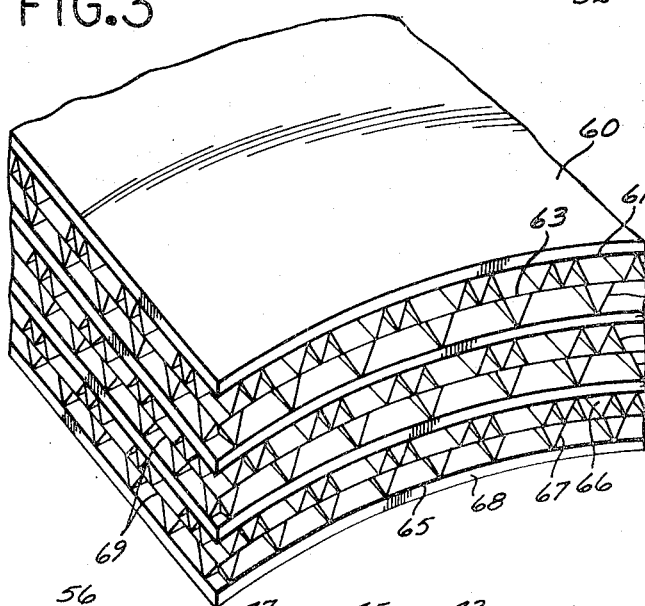
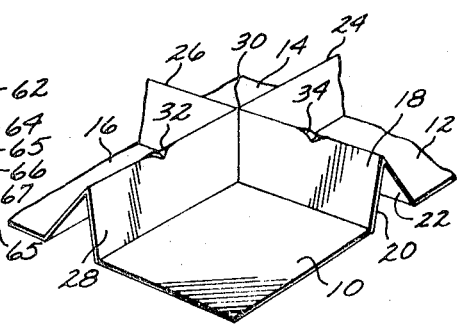
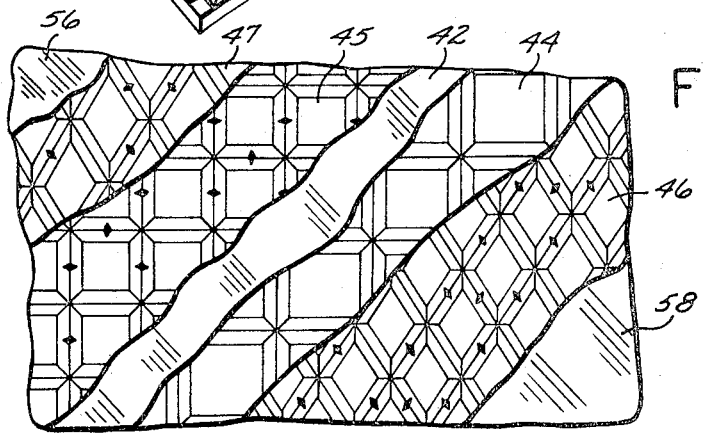

MULTILAYERED THERMAL INSULATION MATERIAL

This invention relates to improvements in multilayered thermal insulation materials. It relates particularly to a thermal insulation material in blanket form which is flexible.

An object of the invention is to provide an improved thermal insulation material in blanket form which is sufficiently flexible so that it may be formed in a flat state and applied to a curved or contoured surface. Another object of the invention is to provide an insulation blanket which utilizes and realizes the advantages of heat reflection and which at the same time is flexible in substantial degree. Another object is to provide such insulation which is suitable for cryogenic applications including applications where it is desired to combine vapor cooling and reflection. Another object is to provide a thermal insulation material in blanket form which utilizes reflectivity and has a degree of flexibility and which may be employed in nonvacuum applications in which the density of ambient atmosphere changes over a wide range.

It is an object of the invention to provide thermal insulation materials of the above-described character at minimum cost. A related object is to provide such an insulation material in one form of which the insulating layers comprise sheets of nonmetallic material, such as paper or plastic, upon which a very thin and inexpensive layer of reflective material has been applied.

The simultaneous achievement of high-insulating quality at very low temperatures or over wide temperature ranges, at low-cost, and with substantial flexibility has long been the goal of insulation designers. This goal is achieved in substantial degree in the invention by the provisions of a structure which incorporates the advantages of insulation by reflection while providing substantial strength against such deformation by compression as would multiply conductive heat loss paths. This has been accomplished in substantial degree by the provision of an insulation material including two overlying layers each comprising sheet material advantageously having a reflective surface and formed such that the sheet is divided into a series of pockets isolated by separating walls and by the provision of outer layers of flat material having a reflective surface and between which the two overlying layers are sandwiched with their bossed surfaces back to back; the separating walls of one overlying layer being transposed laterally relative to the separating walls of the other such that the majority of said walls are arranged in other than overlying and parallel relation.

Other objects and advantages of the invention will hereinafter appear in the following specification of the invention and in the embodiment selected for illustration in the accompanying drawings.

In the drawings:

FIG. 1 is a top plan view of a fragment of a layer of heat reflective material the embossing of which forms a pattern of squares;

FIG. 2 is a top plan view of a fragment of embossed heat reflective material in which the embossing has formed a pattern of diamonds;

FIG. 3 is an isometric view of a fragment of a curved sheet of insulating material which embodies the invention;

FIG. 4 is an isometric view of a fragment of the reflecting material illustrated in FIG. 1; and FIG. 5 is a top plan view of a piece of insulating blanket embodying the invention the several layers of which are shown fragmented.

The invention employs at least four layers. Two and advantageously all four of them are formed of reflective material or of a material which is provided with a reflective coating. The latter is preferred because reflective materials are usually good conductors of heat. It is desired to insulate using reflection while minimizing heat transfer from one layer to the other by conduction. Two of the layers are embossed such that a plurality of pockets are formed each pocket being separated from the others by a wall which surrounds the pocket and is common to it and adjacent pockets whereby air will be entrapped within the pockets when the embossed layers are arranged with their bossed sides toward one another and when the other side of each embossed layer is overlaid with a flat sheet of material. It is the structure, rather than the process of its formation, which is important in the case of the embossed layers. Thus these layers can be formed of honeycomb material overlaid with flat sheets to form a series of dead air pockets isolated by the honeycomb walls. Formed of reflective material or a material coated with a reflecting substance, a honeycomb would provide an entirely adequate embossed layer within the invention.

However, in the preferred embodiment the separating walls between adjacent air pockets of the embossed layers are formed of a double thickness of material spaced sufficiently to permit the flow of gas between the double walls entirely around each air pocket. Advantageously, this double wall structure extends from the wall around one pocket to the wall around every other pocket whereby a pathway is formed for the movement of air or gas from one section of separating wall to substantially every other section of separating wall throughout the area of the sheet. Thus the term "embossed sheet" advantageously means a network, such for example as a latticework, of double walls the space between each section of which is in communication with the space between every other section, the double walls serving to isolate a series of pockets which form dead air pockets when the "embossed layer" has its sides covered with a layer of enclosing material.

A sheet of this kind is illustrated in FIG. 1. The embossed sheet there shown has been formed by an embossing or pressing process from a flat sheet of material. The bosses are square in this case and the lattice structure that divides the bosses is formed of a grid of V-shaped separating walls.

The construction of this embossed layer is shown in greater detail in FIG. 4. This figure illustrates the separating wall sections between four adjacent pockets the bottom walls of which are designated by the reference numerals 10, 12, 14 and 16, respectively. The pocket whose bottom wall is numbered 10 is separated from the pocket whose bottom wall is numbered 12 by a wall structure 18 which has inverted V-shape in cross section being formed of two walls 20 and 22 which are integrally formed at their lower margins with the wall sections 10 and 12, respectively, and are integrally formed one to the other at their upper margin. The wall section 18 is integrally formed with the wall sections 24, 26 and 28 which separate other pairs of the pockets. These several wall sections are joined at an intersection designated by the reference numeral 30. Advantageously, the wall sections have uniform height so that they can be fixed, as by an adhesive, to an overlying layer of flat material whereby the pocket will be sealed shut and become a dead air space. To form the shape shown so that the structure will be formed as shown is well within the capability of the art and existing tooling. Paper can be formed in the shape shown if formed while heated.

Nonetheless, in most applications of the insulation it will not be essential that the individual pockets be entirely sealed from the other pockets. In fact, in the preferred form of the invention the apex or ridge of the wall section is indented to form a short space along its length having reduced height whereby communication is afforded between adjacent pockets even after the walls are glued to an overlying covering layer of material. Two such indentations are illustrated in FIG. 4. One is designated by the numeral 32 and is formed in wall section 28. The other is designated by the reference numeral 34 and is formed in wall section 18. FIG. 4 illustrates in enlarged form the structure of the sheet of FIG. 1 where a few of the wall structures have been designated by the reference numerals 36 and the bottom walls of representative pockets have been designated by the reference numeral 38. Thus, several wall sections are provided with indentations designated by the reference numeral 40. These indentations are like the indentations 32 and 34 of FIG. 4.

At least two embossed sheets are employed in the insulating structure of the invention. Two sheets are arranged so that the walls separating the air pockets of one are laterally offset from the walls that mark the air pockets of the other. The two embossed sheets are assembled together in an insulating blanket by being affixed back to back to one another. An arrangement of this kind is illustrated in FIG. 5. The separating layer 42 is a sheet of flat paper material coated with a thin coating of aluminum on both sides and interposed between double layers of embossed material. The layers 44 and 45 are formed of the material of FIG. 1. Layers 46 and 47 are formed of the same material that is illustrated in FIG. 2. The latticework of walls that separates the several pockets in FIG. 2 has cross-sectional shape like the walls illustrated in FIGS. 1 and 4 whereby FIG. 4 is adequate to describe the details if construction of both FIG. 1 and FIG. 2 with the exception that the bottom walls 50, which are separated by the wall sections 52 in FIG. 2, are diamond-shaped instead of being square as in the case of the pocket walls 38 of FIG. 1. Certain of the wall sections 52 are provided with indentations, such as the indentations 54, which correspond to the indentations 40 in the material of FIG. 1. Because the pockets have different geometrical shape, it is not possible to arrange the embossed layer 46 over the embossed layer 44 so that the dividing lines between their respective pockets overlie one another either vertically or across.

Laterally offsetting the walls of one embossed layer from the walls of the other has several additional advantages. The offset arrangement of the walls adds to the strength which the composite structure presents in opposition to forces tending to compress it. At the same time this construction overcomes the formation of lines of lesser strength along which the material would tend to kink as the blanket is formed over curved surfaces thus insuring instead that the composite structure will be curved evenly when made to conform to a curved surface. This means that fewer thermal short circuits will be developed between the materials that overlie the opposite sides of the embossed layers. Conversely it means that less heavily embossed, and therefore stronger, layers may be employed within the permissible limit of thermal short circuiting. In preferred form the walls of one layer are arranged diagonally to the walls of the other because of the stability afforded by diagonal bracing.

The completed structure in FIG. 5 includes a layer of material 56 overlying the embossed layer 47 and a layer of material 58 overlying the embossed layer 46. These two layers, 56 and 58, are formed of sheet material. The ridges of the walls of the embossed layer 47 are fixed, as by being glued or cemented or otherwise fastened, to the layer 56. The bossed face of the embossed layer 47 lies against the bossed face of embossed layer 45 so that they lie back to back. In like manner the embossed layers 44 and 46 are arranged back to back and the layer 46 is fastened along the ridge of its V-shaped separating walls to the inner surface of the reflective sheet 58. The embossed layers of the back to back assemblies are advantageously fixed to one another and in the preferred embodiment are glued together. The ridges of the V-shaped walls of layers 45 and 44 are glued to opposite sides of the separating layer 42. Both sides of layer 42 must be reflective and at least the inner sides of layers 56 and 58 must be reflective. It is not essential that the embossed layers have reflective surfaces and the advantages of the invention are realized even if they are not reflective. Nonetheless, the invention presents an opportunity to improve insulating quality of the composite structure by metallizing these embossed layers. In the preferred embodiment they are formed of paper or other material which is a poor conductor of heat to avoid conductive loss. It avails little to metallize the bossed side of the embossed layers because large areas of the bosses of one sheet contact large areas of the other. Metallizing these surfaces would only facilitate conduction from one to the other.

It will avail little to employ heat reflecting surfaces if heat is permitted to flow by conduction. Accordingly, reflecting surfaces are employed together with dead air spaces in providing an insulating material. The requirement for flexibility in the completed insulating structure dictates that the component layers be formed of flexible material. When such material is used in a nonvacuum condition so that gas or air fills the spaces in the embossed layers, that gas or air will expand and contract with temperature change and apply forces to the structure of the embossed layer tending to deform it sufficiently to produce thermal short circuits. This effect can be overcome in part by incorporating means for permitting a slow circulation of air through the insulating material sufficient to insure uniformity of pressure within a given layer. The indentations 40 in the material of FIG. 1 and 54 in the material of FIG. 2 serve this purpose. Not all walls around all pocket spaces are provided with indentations but a sufficient number of them are so provided so that ultimately there is communication between all of the air spaces sufficient to equalize pressure without permitting convection currents.

The separating walls are formed of double layered material and are spaced apart to provide an air passage. That passage provides easy communication between all the wall structures whereby equal pressurization at the other side of the embossed layer is accomplished. This construction has another advantage and purpose. The double thickness wall construction provides a latticework of passageways extending over the entire length and width of the insulation blanket through which a cooling medium may be circulated. For example, in the storage of cryogenic liquids it is common to pass the vapors of the cryogen that is boiled away over the surface of the materials which contain and insulate the liquid whereby the heat contained in them will be transferred to the vapors and be carried away. Insulating blankets constructed according to the invention make it practical to utilize the boiled-off vapors for vapor cooling in a nonvacuum, insulating arrangement.

An insulating blanket comprising additional layers together with heavy protective outer layers is illustrated in FIG. 3. The first of the layers of this composite structure is an outer sheet 60 of protective material. Next is a thin sheet of Mylar plastic 61 coated with a reflective material which is glued to the underside of the protective sheet 60. The upper edges of the separating walls of a sheet of diamond-shaped embossed material, similar to the material shown in FIG. 2, are glued to the lower side of the Mylar sheet 61. The diamond-shaped embossed layer is designated by the reference numeral 62. The numeral 63 designates a glue line or layer interconnecting layer 62 with layer 64. Layer 64 comprises a sheet of embossed material the bosses of which are square but are larger than those of the material depicted in FIG. 1. The layers 65 are sheets of aluminized Mylar, layers 66 are diamond-shaped embossed layers like layer 62. The layers 67 are embossed layers which, like layer 64, are embossed in a pattern of squares. The lower layer 68 is a protective sheet to which is glued one of the metallized Mylar sheets 65. The glue lines between the layers 66 and the layers 67 are designated 69.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A multilayered thermal insulation material including two overlying layers each comprising sheet material formed such that the sheet is divided into a series of pockets isolated one from the other by separating walls formed by two thicknesses of material spaced to define a passageway substantially continuous around the pockets of the layer and common to adjacent pockets, whereby said walls define a flow path for movement of gas through the insulation material around substantially all of the pockets of the layer they form;

and further including an intervening layer of material interposed between the two overlying layers;

the intervening layer having a reflective surface on at least one of its sides, and being connected at both sides to said two thicknesses of material associated respectively with said two overlying layers;

the separating walls of one of said overlying layers being transposed laterally relative to the separating walls of the other such that the majority of said walls are arranged in other than overlying parallel relation.

2. The invention defined in claim 1, in which the pockets into which one of said overlying sheets is divided have a dimension, in the plane of said layers, different from that of the pockets into which the other of said overlying layers is divided.

3. The invention defined in claim 1, in which the separating walls of each overlying layer have uniform height, and which further comprises two additional layers of sheet material each having a reflective surface and disposed over and connected to respectively associated one of said overlying layers such that said reflective surfaces face toward one another.

4. The invention defined in claim 1, in which the separating walls are joined to form a ridge and have reduced height at points along said ridge without perforation affording communication for migration of gas from each pocket of at least one of said overlying layers to substantially every other pocket of said overlying layer without affording communication between said pockets and the space between said walls.

5. The invention defined in claim 1, in which at least one of said overlying layers comprises a sheet of metal embossed to form a lattice of bosses of selected geometrical pattern divided by V-shaped walls and in which said intervening layer is formed by the bosses of said embossed layer.

6. The invention defined in claim 5, in which the other of said overlying layers is similarly embossed with a different geometrical pattern, the layers being assembled back to back whereby the bosses of the overlying layers together form said intervening layer; and which further comprises two covering sheets each overlying and fixed to a respectively associated side of the assembly of overlying layers and each having a reflective surface on the side facing said assembly.

7. The invention defined in claim 1, in which two layers of said multilayered insulation material are arranged one against the other with an overlying layer of one bonded back to back directly with an overlying layer of the other.

* * * * *